US008702899B2

(12) United States Patent
Spyrou et al.

(10) Patent No.: US 8,702,899 B2
(45) Date of Patent: Apr. 22, 2014

(54) DRYBLEND PROCESS FOR PREPARING HIGH-REACTIVITY POLYURETHANE COMPOSITIONS CONTAINING URETDIONE GROUPS

(75) Inventors: Emmanouil Spyrou, Schermbeck (DE); Gabriele Brenner, Duelmen (DE)

(73) Assignee: Evonik Degussa GmbH, Essen (DE)

( * ) Notice: Subject to any disclaimer, the term of this patent is extended or adjusted under 35 U.S.C. 154(b) by 330 days.

(21) Appl. No.: 12/809,911

(22) PCT Filed: Nov. 19, 2008

(86) PCT No.: PCT/EP2008/065823
§ 371 (c)(1),
(2), (4) Date: Jun. 21, 2010

(87) PCT Pub. No.: WO2009/095117
PCT Pub. Date: Aug. 6, 2009

(65) Prior Publication Data
US 2010/0263792 A1    Oct. 21, 2010

(30) Foreign Application Priority Data
Feb. 1, 2008 (DE) .......................... 10 2008 007 386

(51) Int. Cl.
*C09J 4/00* (2006.01)
*C09J 101/00* (2006.01)
*C09J 201/00* (2006.01)
*C08G 18/00* (2006.01)

(52) U.S. Cl.
USPC .............................. 156/331.4; 528/80; 528/85

(58) Field of Classification Search
USPC .................................. 156/331.4; 528/80, 85
See application file for complete search history.

(56) References Cited

U.S. PATENT DOCUMENTS

| 3,933,759 | A * | 1/1976 | Hoeschele | 528/45 |
|---|---|---|---|---|
| 6,914,115 | B2 | 7/2005 | Spyrou et al. | |
| 7,019,088 | B1 | 3/2006 | Lehmann et al. | |
| 7,300,997 | B2 | 11/2007 | Wenning et al. | |
| 7,307,135 | B2 | 12/2007 | Spyrou | |
| 7,572,876 | B2 | 8/2009 | Spyrou et al. | |
| 7,709,589 | B2 | 5/2010 | Spyrou et al. | |
| 2003/0153713 | A1 | 8/2003 | Spyrou et al. | |
| 2004/0219367 | A1 | 11/2004 | Spyrou et al. | |
| 2005/0003206 | A1 | 1/2005 | Spyrou et al. | |
| 2005/0090636 | A1 | 4/2005 | Wenning et al. | |
| 2005/0119437 | A1 | 6/2005 | Wenning et al. | |
| 2005/0222364 | A1 | 10/2005 | Rawlins et al. | |
| 2005/0239956 | A1 | 10/2005 | Spyrou et al. | |
| 2005/0239992 | A1 | 10/2005 | Spyrou et al. | |
| 2007/0266897 | A1 | 11/2007 | Spyrou | |
| 2007/0282089 | A1 | 12/2007 | Spyrou | |
| 2008/0097025 | A1 | 4/2008 | Spyrou et al. | |
| 2008/0139753 | A1 | 6/2008 | Spyrou et al. | |
| 2008/0171816 | A1 | 7/2008 | Spyrou et al. | |
| 2008/0182928 | A1 | 7/2008 | Grahl et al. | |
| 2008/0265201 | A1 | 10/2008 | Spyrou et al. | |
| 2010/0249310 | A1 | 9/2010 | Spyrou | |

FOREIGN PATENT DOCUMENTS

| DE | 10 2006 004 077 | 8/2007 |
|---|---|---|
| EP | 1 334 987 | 8/2003 |
| EP | 1 475 399 | 11/2004 |
| EP | 1 475 400 | 11/2004 |
| EP | 1 524 283 | 4/2005 |
| EP | 1 526 146 | 4/2005 |
| EP | 1 903 066 | 3/2008 |
| WO | 00 34355 | 6/2000 |
| WO | 2005 085314 | 9/2005 |
| WO | 2005 095482 | 10/2005 |
| WO | 2005 105879 | 11/2005 |
| WO | 2005 105880 | 11/2005 |
| WO | 2006 040225 | 4/2006 |
| WO | 2008 028769 | 3/2008 |
| WO | 2008 138855 | 11/2008 |

OTHER PUBLICATIONS

Gedan-Smolka, Michaela et al., "New Catalysts for the Low Temperature Curing of Uretdione Powder Coatings", Proceedings of the International Waterborne, High-Solids and Powder Coatings Symposium, XX, XX, pp. 405-419, XP009031587, (Feb. 21, 2001).
Lehmann, Frank et al., "Katalysierte Pulverhaertung bei niedrigen Temperaturen", FARBE&LACK, vol. 106, pp. 62-69, XP 009031589, (Dec. 1, 2000).

* cited by examiner

*Primary Examiner* — Michael Orlando
(74) *Attorney, Agent, or Firm* — Oblon, Spivak, McClelland, Maier & Neustadt, L.L.P.

(57) ABSTRACT

The present invention relates to polyurethane compositions containing uretdione groups that can be cured at a low temperature and are intended more particularly for polyurethane powder coating compositions and adhesive compositions, to a process for preparing them and to their use.

19 Claims, No Drawings

DRYBLEND PROCESS FOR PREPARING HIGH-REACTIVITY POLYURETHANE COMPOSITIONS CONTAINING URETDIONE GROUPS

The present invention relates to polyurethane compositions containing uretdione groups that can be cured at a low temperature and are intended more particularly for polyurethane powder coating compositions and adhesive compositions, to a process for preparing them and to their use.

Externally or internally blocked isocyanates which are solid at room temperature are valuable crosslinkers for thermally crosslinkable polyurethane (PU) powder coating and adhesive compositions.

For example, DE-A 27 35 497 describes PU powder coatings having outstanding weathering stability and heat stability. The crosslinkers whose preparation is described in DE-A 27 12 931 are composed of ε-caprolactam-blocked isophorone diisocyanate containing isocyanurate groups. Also known are polyisocyanates containing urethane, biuret or urea groups, whose isocyanate groups are likewise blocked.

The drawback of these externally blocked systems lies in the elimination of the blocking agent during the thermal crosslinking reaction. Since the blocking agent may thus be emitted to the environment, it is necessary on ecological and workplace safety grounds to take particular measures to clean the outgoing air and to recover the blocking agent. The crosslinkers, moreover, are of low reactivity. Curing temperatures above 170° C. are required.

DE-A 30 30 539 and DE-A 30 30 572 describe processes for preparing polyaddition compounds which contain uretdione groups and whose terminal isocyanate groups are irreversibly blocked with monoalcohols or monoamines. Particular drawbacks are the chain-terminating constituents of the crosslinkers, which lead to low network densities in the PU powder coatings and hence to moderate solvent resistances.

Hydroxyl-terminated polyaddition compounds containing uretdione groups are subject matter of EP 669 353. On account of their functionality of two they exhibit improved resistance to solvents. Powder coating compositions based on these polyisocyanates containing uretdione groups share the feature that, during the curing reaction, they do not emit any volatile compounds. At not less than 180° C., however, the baking temperatures are at a high level.

The use of amidines as catalysts in PU powder coating compositions is described in EP 803 524. Although these catalysts do lead to a reduction in the curing temperature, they exhibit considerable yellowing, which is generally unwanted in the coatings sector. The cause of this yellowing is presumed to be the reactive nitrogen atoms in the amidines. They are able to react with atmospheric oxygen to form N-oxides, which are responsible for the discoloration. EP 803 524 also mentions other catalysts which have been used to date for this purpose, but without indicating any particular effect on the cure temperature. Such catalysts include the organometallic catalysts known from polyurethane chemistry, such as, dibutyltin dilaurate (DBTL), or else tertiary amines, such as 1,4-diazabicyclo[2.2.2]octane (DABCO), for example.

WO 00/34355 claims catalysts based on metal acetylacetonates: zinc acetylacetonate, for example. Such catalysts are actually capable of lowering the curing temperature of polyurethane powder coating compositions containing uretdione groups, but their reaction products are principally allophanates (M. Gedan-Smolka, F. Lehmann, D. Lehmann "New catalysts for the low temperature curing of uretdione powder coatings" *International Waterborne, High solids and Powder Coatings Symposium, New Orleans*, 21-23 Feb. 2001). Allophanates are the reaction products of one mole of alcohol and two moles of isocyanate, whereas in conventional urethane chemistry one mole of alcohol reacts with one mole of isocyanate. As a result of the unwanted formation of allophanate, therefore, isocyanate groups valuable both technically and economically are destroyed.

Certain catalysts accelerate the re-cleaving of uretdione groups to such an extent that, when curatives containing uretdione groups are being used, the cure temperature of powder coating or adhesive compositions can be reduced considerably. Owing to the low curing temperature there is a reduced storage stability. Premature reactions, however, lead to reduced final properties.

The production of dry mixtures (dryblends) is known. Owing to the inhomogeneity of the mixtures, however, the reproducibility of the final properties is consistently inadequate (Pieter Gillis de Lange in "Powder Coatings Chemistry and Technology" Vincentz Network Hanover, 2004, p. 168, p. 214). Here is a call for a process which significantly improves the inadequate reproducibility.

It was an object of the present invention, therefore, to find high-reactivity polyurethane compositions containing uretdione groups that can be cured even at very low temperatures and, moreover, exhibit an unusual storage stability and are suitable more particularly for the production of plastics and of high-gloss or matt, light-stable and weather-stable powder coatings and adhesives. At the same time these compositions ought to be able to be prepared in a reproducible way.

Surprisingly it has been found that the complex profile of requirements identified above is achieved through the present invention.

The present invention accordingly first provides pulverulent compositions having a melting point above 40° C., containing A) at least one curative containing uretdione groups, B) at least one quaternary ammonium salt or phosphonium salt, C) at least one co-catalyst in the form of an epoxide or an acetylacetonate, D) at least one monomeric, oligomeric or polymeric mono- or polyalcohol, if desired E) at least one acid in monomeric or polymeric form, and if desired F) auxiliaries and additives and/or further catalysts.

The compositions of the invention are of high reactivity and have the advantage that in addition they are storage-stable. This means that the NCO content of the composition of the invention decreases by not more than 25% following storage for four weeks at room temperature.

Preferably the curatives A) are based on aromatic, aliphatic, (cyclo)aliphatic and/or cycloaliphatic polyisocyanates and hydroxyl-containing compounds having a free NCO content of less than 5% by weight and a uretdione group content of 1% to 25% by weight (calculated as $C_2N_2O_2$, molecular weight 84).

Polyisocyanates containing uretdione groups are well known and are described in, for example, U.S. Pat. No. 4,476,054, U.S. Pat. No. 4,912,210, U.S. Pat. No. 4,929,724 and also EP 0 417 603. A comprehensive overview of industrially relevant processes for dimerizing isocyanates to uretdiones is supplied by J. Prakt. Chem. 336 (1994) 185-200. Conversion of isocyanates to uretdiones generally takes place in the presence of soluble dimerization catalysts, such as dialkylaminopyridines, trialkylphosphines, phosphorous triamides or imidazoles, for example. The reaction, carried out optionally in solvents but preferably in the absence of solvents, is halted by addition of catalyst poisons when a desired conversion has been reached. Excess monomeric isocyanate is separated off afterwards by short-path evaporation. If the catalyst is sufficiently volatile, the reaction mixture can be freed from the catalyst at the same time as monomer is separated off. In that case there is no need to add catalyst poisons. A broad range of isocyanates is suitable in principle for preparing polyisocyanates containing uretdione groups. Used with preference in accordance with the invention are isophorone diisocyanate (IPDI), hexamethylene diisocyanate (HDI), 2-methylpentane diisocyanate (MPDI), diisocyanatodicyclohexylmethane ($H_{12}$MDI), 2,2,4-trimethylhexamethylene diisocyanate/2,4,4-trimethylhexamethylene diisocyanate (TMDI), norbornane diisocyanate (NBDI), methylenediphenyl diisocyanate (MDI), toluidine diisocyanate (TDI) and tetramethylxylylene diisocyanate (TMXDI). Very particular preference is given to using IPDI and HDI.

The conversion of these polyisocyanates bearing uretdione groups into curatives A) containing uretdione groups involves the reaction of the free NCO groups with hydroxyl-containing monomers or polymers, such as polyesters, polythioethers, polyethers, polycaprolactams, polyepoxides, polyesteramides, polyurethanes or low-molecular mass di-, tri- and/or tetra-alcohols as chain extenders and, if desired, monoamines and/or monoalcohols as chain terminators, and has already been frequently described (EP 669 353, EP 669 354, DE 30 30 572, EP 639 598 or EP 803 524). Polyesters and monomeric dialcohols are preferred. Besides the uretdione groups, the curatives may also contain isocyanurate, biuret, allophanate, urethane and/or urea structures.

Examples of curatives include VESTAGON BF 9030, VESTAGON BF 1320 and VESTAGON 1540 (all Evonik Degussa GmbH) and Crelan EF 403 (Bayer AG). Particular preference is given to VESTAGON BF 9030 and VESTAGON BF 1320.

The fraction of component A) is more particularly 5%-99%, preferably 10%-80% and very preferably 20%-50% by weight, based on the overall composition.

The quaternary ammonium salts or phosphonium salts that are specified as component B) serve as catalysts. Accordingly the catalysts B) are preferably tetraalkylammonium salts or phosphonium salts with halogens or organic or inorganic acid anions as counterion. Examples of suitable catalysts are tetramethylammonium formate, tetramethylammonium acetate, tetramethylammonium propionate, tetramethylammonium butyrate, tetramethylammonium benzoate, tetraethylammonium formate, tetraethylammonium acetate, tetraethylammonium propionate, tetraethylammonium butyrate, tetraethylammonium benzoate, tetrapropylammonium formate, tetrapropylammonium acetate, tetrapropylammonium propionate, tetrapropylammonium butyrate, tetrapropylammonium benzoate, tetrabutylammonium formate, tetrabutylammonium acetate, tetrabutylammonium propionate, tetrabutylammonium butyrate and tetrabutylammonium benzoate, and tetrabutylphosphonium acetate, tetrabutylphosphonium formate and ethyltriphenyl-phosphonium acetate, tetrabutylphosphonium benzotriazolate, tetraphenylphosphonium phenolate and trihexyltetradecylphosphonium decanoate, tetramethylammonium fluoride, tetraethylammonium fluoride, tetrabutylammonium fluoride, tetraoctylammonium fluoride, benzyltrimethylammonium fluoride, tetrabutylphosphonium hydroxide, tetrabutylphosphonium fluoride, tetrabutylammonium chloride, tetrabutylammonium bromide, tetrabutylammonium iodide, tetraethylammonium chloride, tetraethylammonium bromide, tetraethylammonium iodide, tetramethylammonium chloride, tetramethylammonium bromide, tetramethylammonium iodide, benzyltrimethylammonium chloride, benzyltriethylammonium chloride, benzyltripropylammonium chloride, benzyltributylammonium chloride, methyltributylammonium chloride, methyltripropylammonium chloride, methyltriethylammonium chloride, methyltriphenylammonium chloride, phenyltrimethylammonium chloride, benzyltrimethylammonium bromide, benzyltriethylammonium bromide, benzyltripropylammonium bromide, benzyltributylammonium bromide, methyltributylammonium bromide, methyltripropylammonium bromide, methyltriethylammonium bromide, methyltriphenylammonium bromide, phenyltrimethylammonium bromide, benzyltrimethylammonium iodide, benzyltriethylammonium iodide, benzyltripropylammonium iodide, benzyltributylammonium iodide, methyltributylammonium iodide, methyltripropylammonium iodide, methyltriethylammonium iodide, methyltriphenylammonium iodide and phenyltrimethylammonium iodide, tetramethylammonium fluoride, tetraethylammonium fluoride, tetrabutylammonium fluoride, tetraoctylammonium fluoride and benzyltrimethylammonium fluoride. These catalysts can be added alone or in mixtures. They may also be encapsulated or polymerically attached. The catalysts may contain water of crystallization, which is not taken into account in calculating the amount of catalyst employed; in other words, the amount of water is deducted.

In a further embodiment of the present invention the abovementioned catalysts may also be applied to a solid support, silicas for example. This leads to improved grindability and also to easier processing. For this purpose the catalyst is dissolved in a suitable inert solvent (e.g. water) and a corresponding amount of a suitable solid support, the amount being generally exactly the same as the catalyst, is added, an example of the support being Sipernat 2200 (silica from Evonik Degussa GmbH). Also suitable are other precipitated or else fumed silicas. These may be obtained, for example, from Evonik Degussa GmbH under the product name Sipernat™ or AEROSIL™ respectively. Following mixing in the solvent, the latter is removed. Suitability for this purpose is possessed by all technical apparatus suitable for separating off solvents, examples being drying ovens, distillation apparatus or else spray dryers. The resultant product is easy to handle. It no longer has such a tendency to stick, and can also be ground and screened with substantially greater ease.

The fraction of the catalysts B) in the composition of the invention is preferably 0.1% to 5% by weight, preferably from 0.3% to 3% by weight, based on the overall composition. Particular preference is given to using tetraethylammonium benzoate and tetrabutylammonium hydroxide as catalyst B).

Suitable co-catalysts under C) are epoxides or acetylacetonates. Examples for the group of the epoxides include glycidyl ethers and esters, aliphatic epoxides, diglycidyl ethers based on bisphenol A and glycidyl methacrylates. Examples of such epoxides are triglycidyl isocyanurate (TGIC, trade name Araldit 810, Huntsman), mixtures of diglycidyl terephthalate and triglycidyl trimellitate (trade name Araldit PT 910 and 912, Huntsman), glycidyl esters of Versatic acid (trade name Kardura E10, Shell), 3,4-epoxycyclohexylmethyl 3',4'-epoxycyclohexanecarboxylate (ECC), diglycidyl ethers based on bisphenol A (trade name EPIKOTE 828, Shell), ethylhexyl glycidyl ether, butyl glycidyl ether, pentaerythritol tetraglycidyl ether, (trade name Polypox R 16, UPPC AG) and other Polypox products having free epoxy groups. Also suitable, furthermore, are reaction products of mono- or polyisocyanates and glycidyl alcohol.

Further suitable co-catalysts include metal acetylacetonates, an example being lithium acetylacetonate or zinc acetylacetonate.

Preferably the co-catalysts are Araldit PT910 and Araldit PT912. Of course it is also possible to use mixtures of the abovementioned co-catalysts as component C).

The fraction of co-catalysts as component C) is more particularly 0.1% to 5% by weight, preferably 0.3% to 3% by weight, based on the overall composition.

One version of the invention includes the polymeric attachment of the abovementioned catalysts B) or co-catalysts C). Catalysts B) or co-catalysts C) may be attached chemically, for example, to the curative A) or to the alcohol D). For this purpose, for example, epoxide groups of the co-catalyst C) may be reacted with acid groups of a hydroxyl polyester (D). Alternatively a tetralkylammonium hydroxide B) may be reacted with the acid groups of a hydroxyl polyester D) to form a salt.

Both catalysts and co-catalysts may additionally be surrounded with a shell and hence encapsulated.

Examples of microencapsulation are found in, for example, "Microencapsulation and Particle Coating" Center for Professional Advancement (conference proceedings), Amsterdam 2005. Particularly suitable shell materials include polymers, examples being polyesters, polyolefins, polyacrylates, polyethers, polyurethanes, polycarbonates, polyvinyl ethers and other polymers which are specified in the stated literature.

Furthermore, as essential component D), the compositions of the invention contain monomeric, oligomeric or polymeric mono- or polyalcohols. Under reaction conditions, these alcohols react with the functional groups (uretdiones) of the curative and so bring about crosslinking. Particularly suitable monomeric alcohols are mono-, di- or polyols having a molecular weight of at least 32 g/mol.

The monoalcohols are, for example, methanol, ethanol, n-propanol, isopropanol, n-butanol, isobutanol, sec-butanol, the isomeric pentanols, hexanols, octanols and nonanols, n-decanol, n-dodecanol, n-tetradecanol, n-hexadecanol, n-octadecanol, cyclohexanol, the isomeric methycyclohexanols and also hydroxymethylcyclohexane.

The diols are, for example, ethylene glycol, triethylene glycol, butane-1,4-diol, pentane-1,5-diol, hexane-1,6-diol, 3-methylpentane-1,5-diol, neopentyl glycol, 2,2,4(2,4,4)-trimethylhexanediol and neopentyl glycol hydroxypivalate.

The triols are, for example, trimethylolpropane, ditrimethylolpropane, trimethylolethane, hexane-1,2,6-triol, butane-1,2,4-triol, tris(β-hydroxyethyl)-isocyanurate, pentaerythritol, mannitol or sorbitol.

In the group of the oligomeric or polymeric alcohols it is preferred to use polyesters, polyethers, polyacrylates, polyurethanes and/or polycarbonates having an OH number of 5 to 500 (in mg KOH/gram).

Use is made more particularly as component D) of polyesters synthesized from carboxylic acids and preferably polyhydric alcohols.

The carboxylic acids preferred for the preparation of these polyesters may be aliphatic, cycloaliphatic, aromatic and/or heterocyclic in nature and if desired may be unsaturated and/or substituted by halogen atoms. Examples thereof that may be mentioned include the following: succinic, adipic, suberic, dodecanedioic, tetradecanedioic, azelaic, sebacic, phthalic, terephthalic, isophthalic, trimellitic, pyromellitic, tetrahydrophthalic, hexahydrophthalic, hexahydroterephthalic, di- and tetrachlorophthalic, endomethylenetetrahydrophthalic, glutaric, maleic and fumaric acid and—where accessible—their anhydrides, dimethyl terephthalate, bisglycol terephthalate, and also cyclic monocarboxylic acid, such as benzoic acid, p-tert-butylbenzoic acid or hexahydrobenzoic acid.

Examples of suitable polyhydric alcohols include ethylene glycol, 1,2- and 1,3-propylene glycol, 1,4- and 2,3-butylene glycol, di-β-hydroxyethylbutane-diol, 1,6-hexanediol, 1,8-octanediol, neopentyl glycol, cyclohexanediol, 1,4-bis(hydroxymethyl)propane, 2-methylpropane-1,3-diol, 2-methylpentane-1,5-diol, 2,2,4(2,4,4)-trimethylhexane-1,6-diol, glycerol, trimethylolpropane, trimethylolethane, hexane-1,2, 6-triol, butane-1,2,4-triol, tris(R-hydroxyethyl)-isocyanurate, pentaerythritol, mannitol and sorbitol and also diethylene glycol, triethylene glycol, tetraethylene glycol, dipropylene glycol, polypropylene glycol, polybutylene glycol, xylylene glycol and neopentyl glycol hydroxypivalate for the preparation of the polyester D).

Additionally, monoesters and polyesters of lactones, for example ε-caprolactone, or hydroxycarboxylic acids, for example hydroxypivalic acid, ε-hydroxydecanoic acid, ε-hydroxycaproic acid, thioglycolic acid, can be used as starting materials for preparing the polymers D).

Furthermore, polyesters of the abovementioned polycarboxylic acids and/or their derivatives and polyphenols, such as hydroquinone, bisphenol A, 4,4'-dihydroxybiphenyl or bis (4-hydroxyphenyl) sulphone, or polyesters of carbonic acid, which are obtainable from hydroquinone, diphenylolpropane, p-xylylene glycol, ethylene glycol, butanediol or hexane-1,6-diol, and other polyols by typical condensation reactions, for example with phosgene or diethyl and/or diphenyl carbonate, or from cyclic carbonates, such as glycol carbonate or vinylidene carbonate, by polymerization in a known way, are suitable. Exemplified polymers D) which contain carbonate groups can be obtained, as is known, by reaction of the exemplified dihydric or trihydric alcohols of the molecular weight range from 62 to 300 g/mol with diaryl carbonates, such as diphenyl carbonate, phosgene or, preferably, cyclic carbonates, such as trimethylene carbonate or 2,2-dimethyltrimethylene carbonate (NPC), for example, or mixtures of such cyclic carbonates. Particularly preferred carbonate diols are those which are preparable from the stated dihydric alcohols as starter molecules and NPC with ring opening.

Polyesters of silicic acid, polyesters of phosphoric acid, for example from methane-, ethane-, β-chloroethane-, benzene- or styrene-phosphoric acid, -phosphoric chloride or -phosphoric ester and polyalcohols or polyphenols of the abovementioned kind, polyesters of boric acid, polysiloxanes, such as, for example, the products obtainable by hydrolysis of dialkyldichlorosilanes with water and subsequent treatment with polyalcohols, and also the products obtainable by addition reaction of polysiloxane dihydrides with olefins, such as allyl alcohol or acrylic acid, are likewise suitable as starting materials for preparing the polymer D).

Further examples of possible polyesters which can be used as component D) are the reaction products of polycarboxylic acids and glycidyl compounds, as are described, for example in DE-A 24 10 513.

Examples of glycidyl compounds which can be used are esters of 2,3-epoxy-1-propanol with monobasic acids which have 4 to 18 carbon atoms, examples being glycidyl palmitate, glycidyl laurate and glycidyl stearate, alkylene oxides having 4 to 18 carbon atoms, such as butylene oxide, and glycidyl ethers, such as octyl glycidyl ether, for example.

The abovementioned polyesters can be obtained in conventional manner by condensation in an inert gas atmosphere at temperatures of 100 to 270° C., preferably 130 to 230° C., in the melt or in an azeotropic procedure, as described, for example, in Methoden der Organischen Chemie (Houben-Weyl); volume 14/2, pages 1 to 5, 21 to 23, 40 to 44, Georg Thieme Verlag, Stuttgart, 1963, or in C. R. Martens, Alkyd Resins, pages 51 to 59, Reinhold Plastics Appl. Series, Reinhold Publishing Comp., New York, 1961.

Suitable polymers D) further include hydroxy-functional polyethers and polycarbonates. Preferred polyethers can be prepared, for example, by polyaddition of epoxides, such as ethylene oxide, propylene oxide, butylene oxide, trimethylene oxide, 3,3-bis(chloromethyl)oxabicyclobutane, tetrahydro-furan, styrene oxide or the 2,5-bis-epoxypropyl ether of diphenylolpropane; by cationic polymerization in the presence of Lewis acids, such as boron trifluoride, for example; or by anionic polymerization with alkali metal hydroxides or alkali metal alkoxides; or by addition reaction of these epoxides, where appropriate in a mixture or in succession, with starter components containing reactive hydrogen atoms, such as alcohols or amines, examples being water, ethylene glycol, polypropylene 1,3- or 1,2-glycol, pentamethylene glycol, hexanediol, decamethylene glycol, trimethylolpropane, glycerol, aniline, ammonia, ethanolamine, ethylenediamine, di(β-hydroxypropyl)methyl-amine and also hydroxyalkylated phenols, such as di(β-hydroxyethoxy)-resorcinol, for example.

Also suitable as polymers D), furthermore, are, for example, the polythioethers, polyacetals, polyepoxides, polyesteramides or polyurethanes of the molecular weight range 250 to 8500 g/mol which are known in polyurethane chemistry and which contain hydroxyl groups that are reactive towards isocyanate groups.

Particular preference is given to using hydroxyl-containing polyesters having an OH number of 15 to 150 and an average molecular weight of 500 to 8000 g/mol as component D).

It is of course also possible to use mixtures of the above-mentioned monomers, oligomers and/or polymers. The polymers may be amorphous or else partially crystalline. The fraction of component D) is more particularly between 1% and 95% by weight, preferably 2% to 50% by weight, based on the overall composition.

The compositions of the invention may further comprise at least one acid in monomeric or polymeric form (component E). Acids suitable for the purposes of the present invention include all solid or liquid, organic or inorganic, monomeric or polymeric compounds which possess the properties of a Brönstedt or a Lewis acid. Examples that may be mentioned include the following: sulphuric, acid, acetic acid, benzoic acid, malonic acid, terephthalic, acid, and also copolyesters or copolyamides having an acid number of at least 20. Where present, the acids are included more particularly in a fraction of 0.1% to 10% by weight, based on the overall composition.

The compositions of the invention may further comprise auxiliaries and additives that are customary in coatings or adhesive technology, and/or further catalysts, as component F). Examples of such auxiliaries and additives are flow control agents, such as polysiloxanes or acrylates, light stabilizers, such as sterically hindered amines, or other auxiliaries, as described in EP 669 353, for example. As auxiliaries it is also possible, moreover, for fillers and pigments, such as titanium dioxide, to be present, for example, in an amount of up to 50% by weight in the overall composition. Where present, the fraction of the stated auxiliaries and additives is more particularly 0.001% to 55% by weight, based on the overall composition.

Optionally it is possible for additional catalysts of the kind already known in polyurethane chemistry to be present. These are primarily organometallic catalysts, such as dibutyltin dilaurate, or else tertiary amines, such as 1,4-diazabicyclo[2.2.2]octane, for example, in amounts more particularly of 0.001% to 1% by weight.

Likewise provided by the present invention are processes for preparing the pulverulent compositions of the invention, comprising the dry blending of individual components A) to F) or the dry blending of homogeneous mixtures of individual components A) to F), with the proviso that components B) and C) are not present in the same homogeneous mixture.

The process of the invention is therefore based on the dry blending of individual constituents of the composition of the invention or mixtures of individual constituents.

A dryblend in the sense of the present invention is a mixture which is brought about not with complete melting of all of the components, or with complete dissolution of all of the components. Consequently, such dryblends are also not completely homogeneous. The operation of dry blending may take place in any mixer known to the skilled person and suitable for the purpose. The mixture in question more particularly comprises stirred tanks of all kinds (e.g. Lödige mixers), shaker mixers (e.g. Turbular) and other assemblies which are able to mix pulverulent compositions at room temperature.

In the simplest case the individual components are blended dry, in other words solvent-free, to prepare the pulverulent compositions of the invention. In an alternative embodiment of the process of the invention, homogeneous mixtures of individual components of the composition are blended dry with one another. In the case of this variant of the process, components B) and C) must not be present in the same homogeneous mixture, so as to avoid unwanted preliminary reactions.

Homogeneous mixtures are a mixture either in solvent or in the melt. The homogenization of the constituents for the purpose of producing the component mixtures may take place in suitable assemblies, such as heatable stirred tanks, kneading apparatus or else extruders, for example, and upper temperature limits of 120 to 130° C. ought not to be exceeded. Preferably the components A) and D) are used together in one homogeneous mixture. Preference is also given to the addition of component C) to this homogeneous mixture of A) and D). Thereafter the components or component mixtures are ground, either individually or together, and sieved. The maximum particle size for sieving is 200 μm, preferably 100 μm. Subsequently all of the ground and sieved constituents are mixed with one another dry, carefully, in a suitable mixing apparatus (e.g. Turbular). This mixture can, if necessary, be sintered together again in an additional step at an elevated temperature just below the melting point, and can then in turn be ground and sieved to a desired size.

Likewise provided by the invention are adhesive compositions containing the compositions of the invention, and also the use of the compositions of the invention for producing adhesive bonds of metal, plastic, glass, wood, textile, paper or leather substrates, fibre composites or other heat-resistant substrates.

The invention likewise provides powder coating materials containing the compositions of the invention, and also the use of the compositions of the invention for producing surface coatings on metal, plastic, glass, wood or leather substrates or other heat-resistant substrates.

Likewise provided by the invention are metal-coating compositions containing the compositions of the invention, more particularly for car bodies, motorbikes and bicycles, architectural components and household appliances, wood-coating compositions, glass-coating compositions, leather-coating compositions and plastic-coating compositions.

In the context of the uses according to the invention, the compositions of the invention are applied to the substrate in an appropriate way, such as by spraying, fluid-bed sintering or scattering, for example. The application of ready-to-spray powders to appropriate substrates may take place in accordance with the known methods, such as by electrostatic powder spraying, fluid-bed sintering, or electrostatic fluid-bed sintering, for example. In the case of adhesive bonds, the powder is applied to the substrates that are to be joined, which are then pressed against one another.

Following application, the coated workpieces are cured by heating to a temperature of 60 to 220° C. for 1 to 60 minutes, preferably at 80 to 160° C. for 6 to 30 minutes.

Even without further remarks, it is assumed that a skilled person will be able to utilize the above description in its widest context. Consequently the preferred embodiments and examples are to be interpreted merely as a descriptive disclosure which has no limiting effect whatsoever. The present invention is illustrated below, using examples. Alternative embodiments of the present invention are obtainable by analogy.

EXAMPLES

The OH number is determined in accordance with DIN 53240-2. With this method, the sample is reacted with acetic anhydride in the presence of a 4-dimethylaminopyridine catalyst, the hydroxyl groups being acetylated. This produces one molecule of acetic acid per hydroxyl group, whereas the subsequent hydrolysis of the excess acetic anhydride yields two molecules of acetic acid. The consumption of acetic acid is determined by titrimetry, from the difference between the main value and a blank value carried out in parallel.

The NCO number is determined wet-chemically with addition of dibutylamine and subsequent titration of the excess dibutylamine with hydrochloric acid against bromophenol blue. Solvents used may be mixtures of isopropanol and water.

The uretdione content is determined wet-chemically with addition of butylamine and subsequent titration of the excess butylamine with hydrochloric acid against bromophenol blue. Solvents used may be mixtures of isopropanol and water.

| Ingredients | Product description, manufacturer |
|---|---|
| VESTAGON EP BF 9030 | Curative (A), uretdione content: 11.5-13.0%, softening point: 74-75° C., $T_g$: 40-50° C., Evonik Degussa GmbH, Coatings & Colorants |
| TEAB | Catalyst, tetraethylammonium benzoate (B), Fluka |
| DYNACOLL 7330 | (Partially)crystalline OH polyester D), OH number 31 mg KOH/g, m.p.: 81° C., Evonik Degussa GmbH, Coatings & Colorants |
| Sipernat 2200 | Precipitated silica, Evonik Degussa GmbH, Feststoffe und Pigmente |
| ARALDIT PT 910 | Co-catalyst C), containing epoxide groups, Vantico, |
| KRONOS 2160 | Titanium dioxide, Kronos |
| RESIFLOW PV 88 | Flow control agent, Worlee | m.p.: melting point; $T_g$: glass transition point

Example 1 a) Homogeneous Mixture of A), C) and D)

61.65 g of DYNACOLL 7330 (component D) are charged to a steel pot at 120° C. (thermostat setting) and melted with stirring in approximately 1 h. Subsequently, at the same temperature, 35.35 g of VESTAGON BF 9030 (component A) are added in one portion and stirring is continued for about 1.5-2 h. Thereafter 1 g of Araldit PT 910 (component C) is added and stirring takes place for 15 min more. When a homogeneous melt is present, the product can be dispensed. The cooled melt is subjected to preliminary chopping in a household blender (Braun, type 4142) and subsequently ground. The grinding operation is carried out on a rapid rotor mill (Fritsch, Pulverisette 14) with assistance from liquid nitrogen. The $N_2$ cooling prevents the product sticking in the mill. The product, which has become moist, must thereafter be dried at room temperature in a vacuum drying cabinet (50 mbar). When the product is dry (assessed visually from the free-flowability), it is applied to an analytical sieve machine (Retsch, type AS200 Basic) and sieved to a particle size of <63 µm.

b) Preparation of a Mixture of Teab and Sipernat 2200

50 g TEAB (component B) are charged together with 150 ml of fully demineralized water to a 500 ml round-bottom flask and this initial charge is dissolved at room temperature over the course of five minutes. Thereafter 50 g of Sipernat 2200 (support) are added and concentration takes place on a rotary evaporator at 50° C. and about 6 mbar. The very largely dry product is comminuted in a mixer and subsequently dried to constant mass in a vacuum drying cabinet at 50° C. (50 mbar). Subsequently it is ground and sieved to <63 µm.

c) Preparation of the Composition of the Invention 98 g of the homogenized and comminuted mixture of A), C) and D) (Example 1 a) are weighed out together with 2 g of the mixture from step b) into a 1 l Turbula plastic vessel and mixed for 30 minutes on a shaker mixer (Bachhofen A G, Turbula type, Schatz system) at 46 rpm. Thereafter the mixture is distributed on a metal drying plate and partially sintered at 80° C. for about 15-20 minutes. After that it is ground again and sieved off to a particle size of 100-200 µm. This gives a powder having a melting point of about 90° C. and an NCO content of 4.40% (theory: 4.37%). The NCO number remains virtually constant (4.20%) even after 4 weeks at room temperature, which demonstrates the storage stability of the blend of the invention.

d) Comparative Experiment 61.65 g of DYNACOLL 7330 are charged to a steel pot at 120° C. (thermostat setting) and melted with stirring over the course of about an hour. Subsequently, at the same temperature, 35.35 g of VESTAGON BF 9030, 1 g of PT 910 and 2 g of the mixture of TEAB and Sipernat are added.

d1) Over the course of 15 min at this temperature the mixture undergoes gelling.

d2) If the temperature is lowered to room temperature within 10 min following the addition of the last component, the result, after milling and sieving to 100-200 µm, is a powder with an NCO content of 2.60% (theory 4.37%). After four weeks at room temperature, the NCO number drops to 1.90%, and the powder can no longer be fully dissolved.

Example 2

General Procedure for Bonding Textiles

Two cloths measuring 110 mm×110 mm are cut from a cotton fabric. The pulverulent composition is scattered onto the bottom half of one cotton cloth, to the area of 100 mm×50 mm where bonding is to take place, with the aid of a sieve having a mesh size of less than 160 µm. The weight applied is approximately 30 g/m². The powder is sintered onto the fabric surface for five minutes in a hot-air oven at a temperature of 10° C. above the melting point of the powder.

After cooling, the cotton cloth with its preliminary coating of adhesive is laminated with the uncoated cloth in a press at a temperature of 140° C. for 10 minutes under a pressure of 10 bar.

After one day, test strips measuring 15 mm wide and 110 mm long are cut from the fabric union, the bonding length being 50 mm. The two outer strips are discarded.

For the test of the peel strength, the ends of the non-bonded fabric strips are fixed in the top and bottom clamping devices of the tensile testing machine and are separated at a speed of 50 mm/minute at an angle of 180° in accordance with DIN EN 28510.

The figure reported is the maximum force Fmax in N as the average value from 5 measurements. Above a force Fmax of 4 N, the adhesive bond is considered to be good.

3) Textile Bonding with 1c) and 1d2)

Textile bonding for the composition 1 c) according to the invention results in good adhesion, with an Fmax value of 6.9 N. The noninventive composition 1d2) can no longer be melted and hence cannot be used for an adhesive bond.

The invention claimed is:

1. A pulverulent composition, comprising:
    a sieved dry blend of particles of the following components or particles of homogeneous mixtures of combinations of some of the following components:
    A) at least one curative comprising at least one uretdione group;
    B) at least one quaternary ammonium salt or phosphonium salt;
    C) at least one epoxide or acetylacetonate;
    D) at least one monomeric, oligomeric, or polymeric mono or polyalcohol;
    E) optionally, at least one acid in monomeric or polymeric form; and
    F) optionally, at least one auxiliary, additive, and/or further catalyst;
    wherein
    an isocyanate content of the pulverulent composition decreases by not more than 25% upon storage for four weeks at 25° C.,
    a maximum particle size of the seived particles is 200 µm,
    components B) and C) are not in a same homogeneous component mixture, and
    a melting point of the composition is greater than 40° C.

2. The pulverulent composition according to claim 1, wherein the at least one curative A) comprises the reaction product of:
    at least one selected from the group consisting of an aromatic polyisocyanate, an aliphatic polyisocyanate, a (cyclo)aliphatic polyisocyanate, and a cycloaliphatic polyisocyanate; and
    at least one hydroxyl-comprising compound;
    wherein
    a free NCO content of the at least one curative A) is less than 5% by weight, and
    a uretdione group content of the at least one curative A) is 1% to 25% by weight.

3. The pulverulent composition according to claim 1, wherein a content of A) is 5% to 99% by weight, based on a weight of the pulverulent composition.

4. The pulverulent composition according to claim 1, wherein B) comprises at least one tetraalkylammonium salt or phosphonium salt with at least one halogen or organic or inorganic acid anion as counterion.

5. The pulverulent composition according to claim 1, wherein a content of B) is 0.1% to 5% by weight, based on a weight of the pulverulent composition.

6. The pulverulent composition according to claim 1, wherein B) is tetraethylammonium benzoate and tetrabutylammonium hydroxide.

7. The pulverulent composition according to claim 1, wherein a content of C) is 0.1% to 5% by weight, based on a weight of the pulverulent composition.

8. The pulverulent composition according to claim 1, wherein D) is at least one polyester.

9. The pulverulent composition according to claim 1, wherein D) is at least one hydroxyl-comprising polyester having an OH number of 15 to 150 and an average molecular weight of 500 to 8000 g/mol.

10. The pulverulent composition according to claim 1, wherein a content of D) is between 1% and 95% by weight, based on a weight of the pulverulent composition.

11. The pulverulent composition according to claim 1, which further comprises at least one selected from the group consisting of an auxiliary, an additive, and a further catalyst; which wherein the auxiliary and additive comprise at least one selected from the group consisting of a flow control agent, a light stabilizer, a filler, and a pigment.

12. A process for preparing the pulverulent composition according to claim 1, comprising:
    dry blending individual components A) to F); or
    dry blending homogeneous mixtures of individual components A) to F), whereby components B) and C) are not present in a same homogeneous mixture; and
    sieving the dry blended mixture to obtain a mixture having a maximum particle size of 200 µm.

13. An adhesive composition, powder coating material, metal-coating composition, wood-coating composition, glass-coating composition, leather-coating composition, or plastic-coating composition comprising the pulverulent composition according to claim 1.

14. A method of manufacturing an adhesive bond of metal, plastic, glass, wood, textile, paper, or leather substrates, or fiber composite, comprising applying the pulverulent composition according to claim 1 to a surface of a metal, glass, wood, textile, paper, or leather substrate, or fiber composite, and laminating a second substrate of metal, glass, wood, textile, paper, or leather substrate, or fiber composite to the applied composition to obtain an adhesive bond.

15. A method for producing a surface coating on metal, plastic, glass, wood, or leather substrates, comprising adding the pulverulent composition of claim 1 to a surface coating mixture or surface coating precursor.

16. The pulverulent composition according to claim 1, wherein the at least one quaternary ammonium salt or phosphonium salt B) comprises a solid support.

17. The pulverulent composition according to claim 16, wherein the solid support is a fumed or precipitated silica.

18. The pulverulent composition according to claim 1, wherein the quaternary ammonium salt or phosphonium salt is encapsulated with a polymer shell, the epoxide or acetylacetonate is encapsulated with a polymer shell, or both the quaternary ammonium salt or phosphonium salt B) and the epoxide or acetylacetonate are each encapsulated with a polymer shell.

19. The pulverulent composition according to claim 1, wherein at least one of the at least one quaternary ammonium salt or phosphonium salt B) and the epoxide or acetylacetonate C) is chemically attached to the curative A) or the alcohol D).

* * * * *